Inventor
E. M. COLE
By Paul Eaton
Attorney

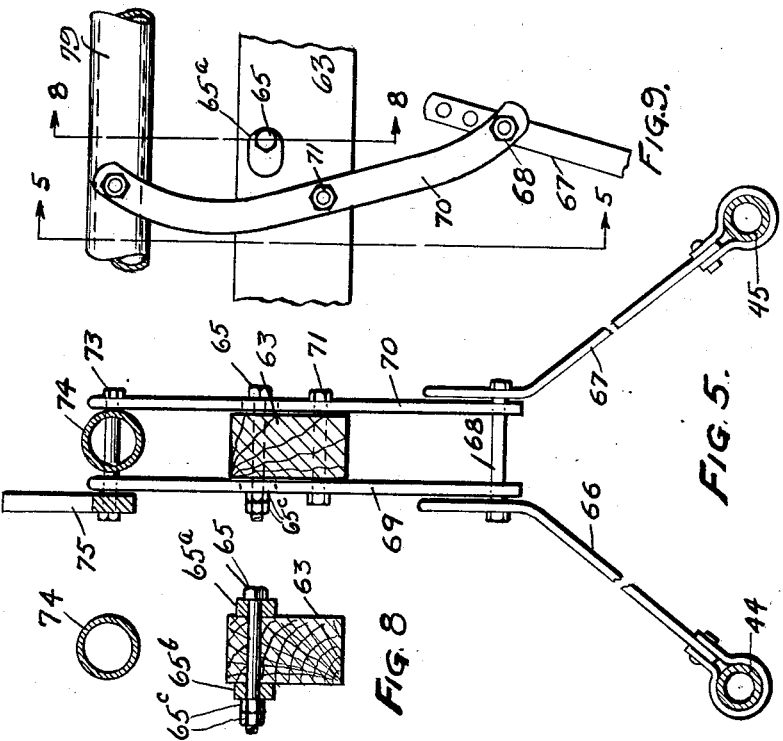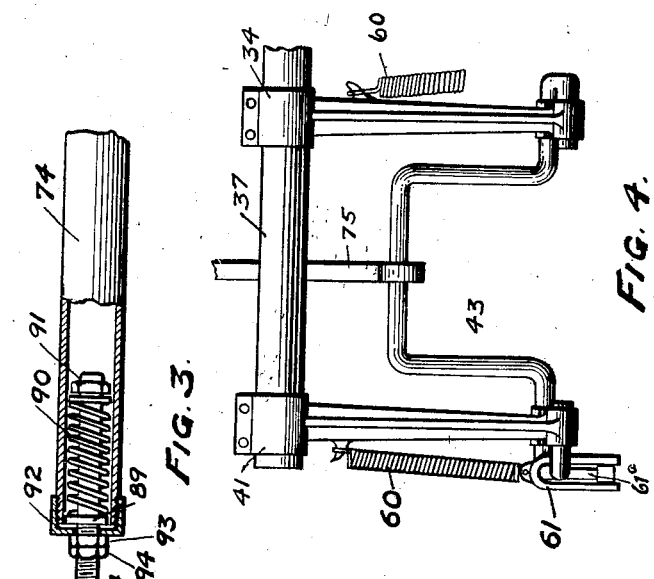

June 21, 1932.  E. M. COLE  1,864,121
CULTIVATOR ATTACHMENT FOR TRACTORS
Filed Nov. 9, 1928  4 Sheets-Sheet 4

Inventor
E. M. Cole
By
Ramsey Eaton
Attorney

Patented June 21, 1932

1,864,121

UNITED STATES PATENT OFFICE

EUGENE M. COLE, OF CHARLOTTE, NORTH CAROLINA

CULTIVATOR ATTACHMENT FOR TRACTORS

Application filed November 9, 1928. Serial No. 318,275.

This invention relates to tractor cultivators, and more especially relates to improved means for adjusting the pressure exerted upon the cultivators proper, together with means for allowing cultivators to withstand excessive pressure without injury to the cultivator mechanism, and to the means for regulating the depth of cut of the cultivator members.

The main object of my invention is to provide a tractor with cultivator members on each side thereof, said cultivator members being mounted on the tractor in such a manner as to positively force the cultivators into the ground, together with means for allowing the cultivator members to swing upwardly when excessive pressure is exerted upwardly upon them, such as by striking a hard place in the ground, a stump, stone, or other relatively immovable object.

Another object of my invention is to provide a cultivator attachment for a tractor with combined means for raising the cultivator members and for forcing the cultivator members into engagement with the ground, said means being capable of yielding movement when the cultivating members strike abnormal conditions in the ground which is being cultivated.

A still further object of my invention is to provide earthworking members adapted to be attached to both sides of a tractor, said cultivating members being adapted to be used not only for cultivating crops, but also being adapted to be used for breaking hard ground, and with this object in view I have devised a positive control for regulating the depth of the earthworking members, and in said positive control I embody tensional yielding means for allowing the earthworking elements to move upwardly when the character of the ground being engaged by the earthworking implements would cause injury to said implements unless they were permitted to move upwardly.

Another object of my invention is to provide a cultivator mechanism adapted to be attached to the sides of a tractor and having a framework so constructed as to be rigid enough to withstand the pressure exerted thereon without springing out of place, said framework having tensional means embodied therein for forcing the cultivator members into the ground, and at the same time allowing the cultivator members to spring upwardly under excess pressure, due to a high place in the ground being cultivated or broken, without springing the framework of the mechanism out of place.

Another object of my invention is to provide a cultivator mechanism for tractors having tensional trip means for regulating the depth of cut of the cultivator members, and means for preserving this trip effect at all times.

Some of the objects of my invention have been stated; other objects will appear as the description proceeds, when taken in connection with the accompanying drawings, in which—

Figure 3 is an enlarged, detailed view, with portions thereof shown in cross-section, illustrating the yielding means for regulating the depth of the cultivator members;

Figure 4 is an enlarged, detailed view, looking from the right-hand end of Figure 1;

Figure 5 is a vertical, cross-sectional view, taken along the line 5—5 in Figure 1, and also line 5—5 in Figure 9.

Figure 8 is a cross-sectional view taken along the line 8—8 in Figure 9;

Figure 9 is an elevation, the right-hand side of Figure 5.

Figure 1:
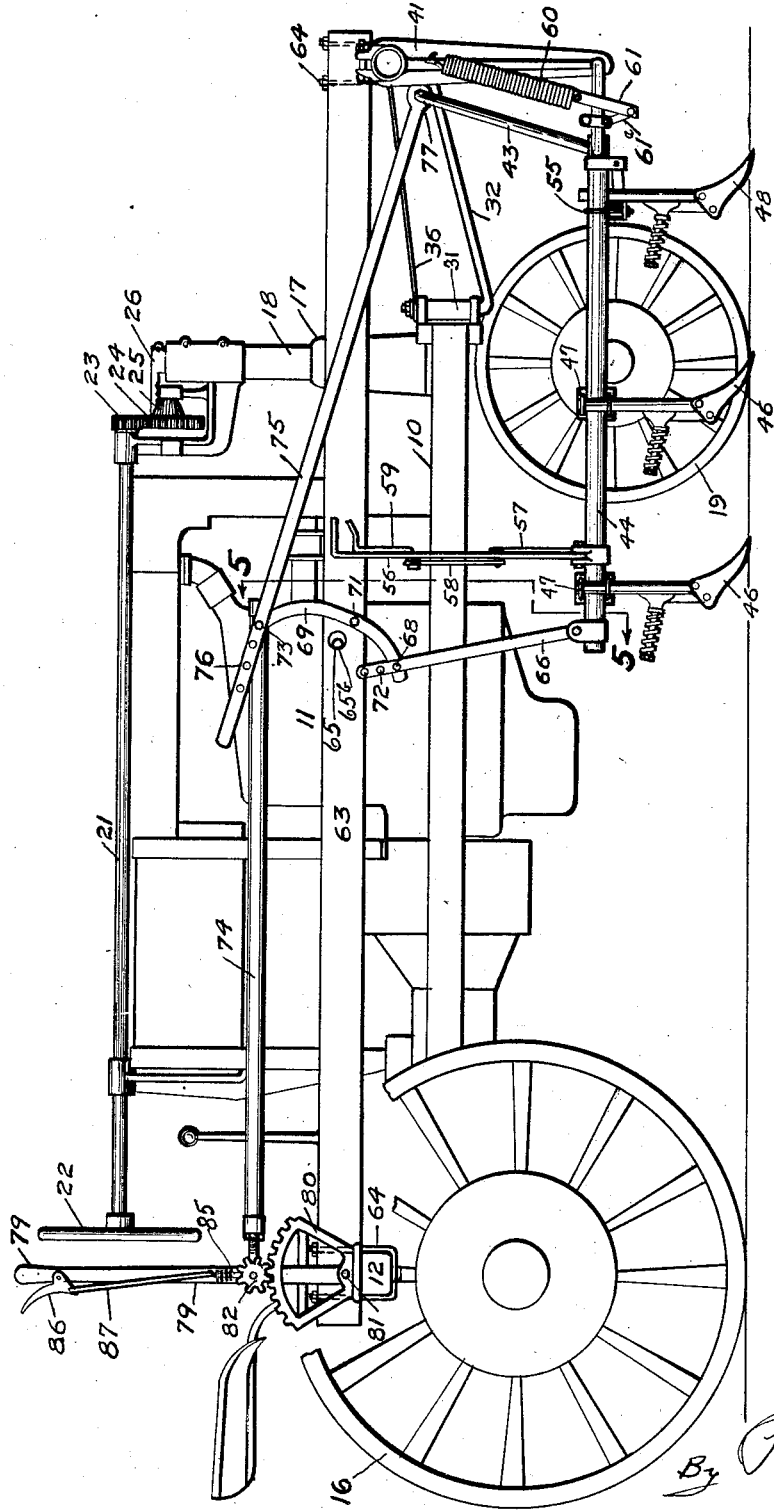
Figure 1 is a side elevation of a tractor, showing one side thereof equipped with my invention.
Figure 2:
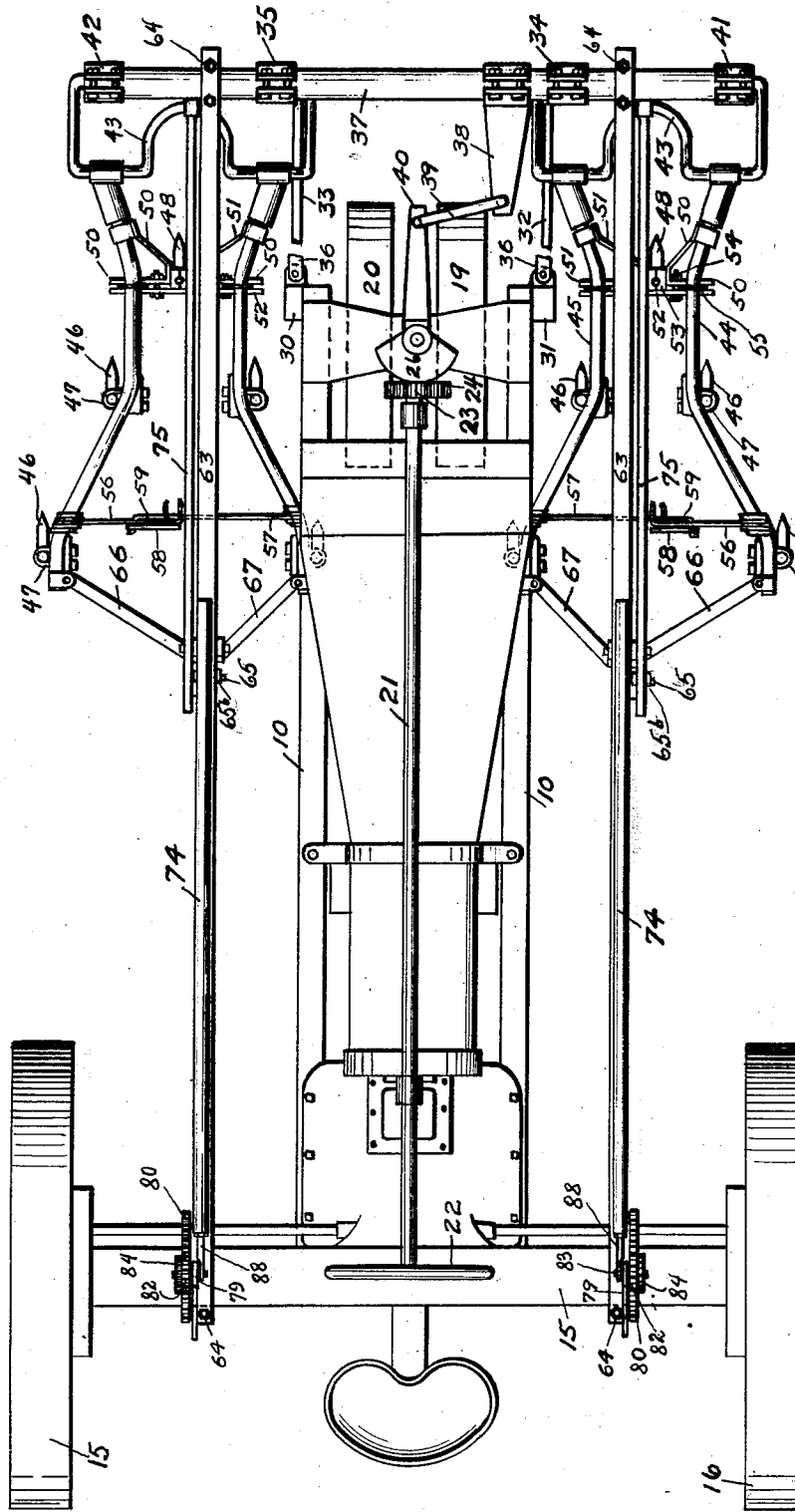
Figure 2 is a top plan view of a tractor, showing the same equipped on both sides with my device.
Figure 6:
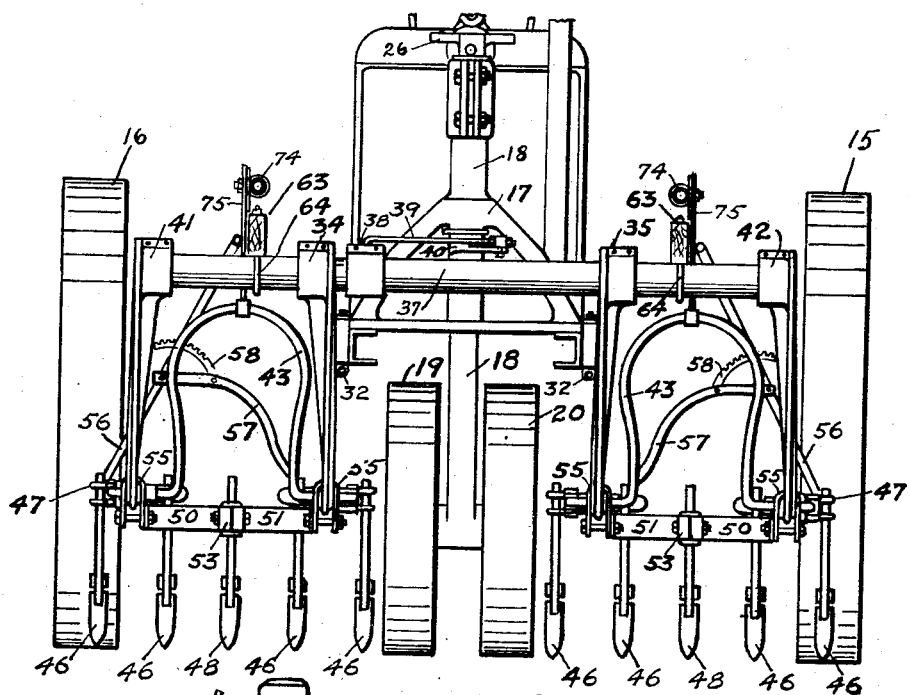
Figure 6 is a front elevation of a tractor, showing the same equipped with my device.
Figure 7:
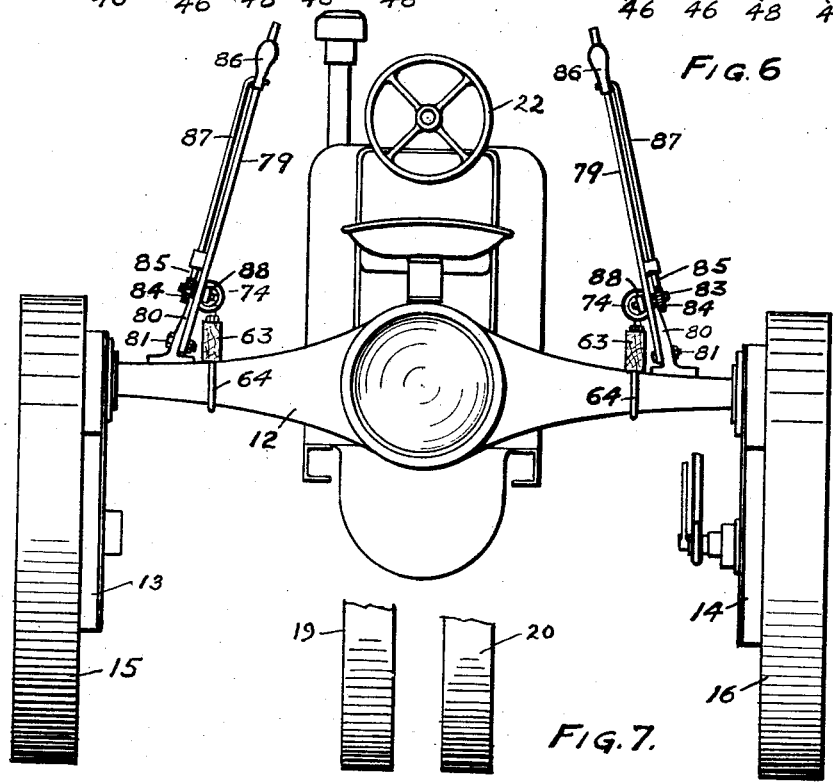
Figure 7 is a rear elevation of a tractor, showing the mounting of the adjusting mechanism for my cultivator members.

Referring more particularly to the drawings, the numeral 10 indicates side frame members of the tractor, which have mounted thereon a motor 11 which is geared to the interior mechanism of rear axle 12, which is in turn geared to gear boxes 13 and 14, on which rear wheels 15 and 16 are mounted, and the front portion of the tractor frame has a forked supporting member 17, in which an upstanding post 18 is mounted, and on the lower end of this post 18 are mounted front wheels 19 and 20, and secured on the top of the tractor is a steering rod 21, having a steering wheel 22, which by means of gears 23 and 24 and 25, engaging a segment 26, secured on the post 18, serves to guide the tractor.

On the front end of the tractor and preferably secured to the members 10 are cuffs 30 and 31 each of which has a vertically disposed hole therein, in which forwardly projecting rod members 32 and 33 are secured and the front portions of these members 32 and 33 are secured to downwardly projecting members 34 and 35, respectively, and the upper ends of the members 32 and 33 are threaded to receive nuts which secure forwardly projecting members 36 to frame said members 32, 33 and 36 acting as a support for a transversely disposed pipe member 37. These members 32, 33, and 36 are pivotally connected at both ends to the members 30, 31, 34 and 35, and secured on the member 37 is an arm 38, which projects rearwardly and has secured thereto a link 39, which has its other end pivotally secured to an arm 40, which is secured around the post 18, and, in this way, the pipe 37 can be swung transversely at the same time the front wheels are turned.

Secured on the outer ends of the member 37 are the downwardly projecting members 41 and 42 and in the lower ends of these downwardly projecting members there is pivotally secured a bail member 43, which is a double bell crank lever and which projects laterally behind these downwardly projecting members and forwardly and inwardly and has a pivotal connection in the lower ends of the said downwardly projecting members. Secured to the laterally projecting portion of the members 43 are cultivator beams 44 and 45, which have cultivators 46 secured thereon in any suitable manner, as by U-bolts 47, and, when it is desired to use the cultivator mechanism for breaking land, I secure an extra cultivator member 48 in between cultivator beams 44 and 45 by means of the members 50, 51 and 52, securing the block 53 in the position in which the shank of the cultivator 48 is secured. The members 51 and 52 are secured to each other by means of bolts 54, and these members 51 and 52 are secured to the cultivator beams by means of a bolt 55.

Pivotally secured to the cultivator beams 44 is the lever 56, which is also pivotally secured to the end of member 57, which member 57 is pivotally secured to the cultivator beam 45 and this member 57 has a ratchet 58 secured thereon, and on the lever 56 there is a pawl 59, which is adapted to engage the ratchet 58, said mechanism being adapted to regulate the width of the cultivator beams from each other, and when the breaking up plow 48 is used, U-bolts 55 must be loosened before this adjustment can be effected. Secured on the outer members 41 and 42 which are secured on the pipe member 37 is a tension spring 60, which projects downwardly and is secured to a clevis 61, which is loosely mounted around the member 43, and is secured to a downwardly and forwardly projecting arm 61a, which is secured around the longitudinally disposed portion of the member 43, this serving to aid in raising the cultivator members.

A longitudinally disposed beam 63 is mounted on each side of the tractor, and is secured by means of U-bolts 64 to the rear axle housing 12, and to the transversely disposed pipe 37. Secured around the rear portions of the cultivator beams 44 and 45 are inwardly and upwardly projecting members 66 and 67, which have a bolt 68 piercing their upper ends, and on this bolt are pivotally mounted rearwardly curved lever members 69 and 70, which are pivotally mounted, intermediate their ends, on a bolt 71, which pierces the member 63. The upper ends of the members 66 and 67 have a plurality of holes 72 therein for the purpose of adjustment of the depth regulating means. The upper end of the members 69 and 70 are spaced apart from each other and have a bolt 73 loosely mounted therein, which bolt pierces an elongated hollow member 74 and also loosely secures an elongated and forwardly projecting member 75 thereon. This member 75 has a plurality of holes 76 therein, for the purpose of adjustment, and this member 75 projects forwardly and is loosely secured around the upper portion of the U-shaped members 43, as at 77. The hollow member 74 projects rearwardly and is resiliently, and pivotally, secured to a lever, 79, which lever is pivotally secured in a ratchet 80, as at 81, and a cog-wheel 82 meshes with teeth in ratchet 80, and, integral with the wheel 82 is a cog-wheel 84, into the teeth of which wheel 84 a spring-pressed pawl 85 is adapted to engage, which pawl is controlled by a handle member 86 and a rod 87. This resilient connection between the lever 79 and the hollow member 74 comprises a bolt 88, which projects into the hollow member 74 and has loosely secured thereon a washer 89 and a compression spring 90, with a nut 91 on the end of the rod, and a cap 92 is secured on the end of the hollow member 74, with a hole therethrough in which the rod 88 is adapted to slide, and nuts 93 and 94 are threadably secured on the rod 88 to limit the forward movement of the rod 88 into the hollow member 74, but does not interfere with the reverse movement of the rod 84, with relation to the hollow member 74.

The members 43, 44 and 45 and associated parts comprise a cultivator frame on each side of the tractor.

The pipe member 37 and the downwardly projecting members 34, 35, 41 and 42 comprise a forecarriage.

Piercing the longitudinally disposed beam member 63 in the upper portion thereof and to the rear of the members 69 and 70 is a bolt 65 which has eccentric washers 65a and 65b mounted thereon, and when nuts 65c are tightened, these eccentric washers will form fixed cam members which will regulate the rearward swinging of the upper portions of the members 69 and 70. By adjusting the position of the cams 65a and 65b I thereby regulate the depth to which the cultivator members may extend downwardly, and in operation the lever 79 is pulled backwardly until the upper portions of members 69 and 70 press against the cams 65a and 65b, and these cams are so adjusted as to prevent pivot point 68 from reaching a point in alignment with a straight line drawn between the bolt 71 and the lower end of the member 66 and thus a trip effect is preserved, for, if the cam members and bolt 65 were not present, then when the cultivator members should reach an extremely low place in the ground they might drop to a point where the bolt 68 would be forward of the imaginary line referred to, and this would destroy the trip effect, and it might happen that the lower ends of members 69 and 70 would jump forwardly and cause damage to the apparatus.

It might be stated that the position of the parts shown in Figure 1 shows the cultivator members practically elevated.

It might be stated that the purpose of the above-described trip mechanism is that when the member 74 is pulled rearwardly members 69 and 70 will be held against the cam members 65a and 65b, thus holding the described parts and the members 66 and 67 in the desired trip position, which effects a substantial mechanism for holding the cultivator members rigidly in place, of course subjected to the tensional means to take care of any undue upward pressure previously described, and will at the same time prevent the cultivator members, upon reaching a low place in the ground or soft ground, from dropping too far downwardly to destroy the trip effect, and thus cultivator members are held with sufficient rigidity to preserve a uniform depth of cut under all conditions.

In addition to the depth regulating means just described, I wish to also state that the depth to which the cultivators are adjusted to cut is limited in a major sense by the adjustment of the bolt 68 in the holes 72 in the members 66 and 67.

It is thus seen that when the lever 79 is pushed forwardly, the nuts 93 and 94 will prevent forward movement of the rod 88 into the member 74, and the member 74 will be pushed forwardly, which will push the upper ends of the members 43 forwardly, and will thus raise the front ends of the cultivator beams 44 and 45, and, at the same time, the upper portions of the members 69 and 70 will be pushed forwardly, and the lower ends of these members will be raised rearwardly and upwardly, and, by means of the members 66 and 67, will, at the same time, raise the rear ends of the cultivator beams 44 and 45. When it is desired to force the cultivator members into the ground, the lever 79 will be pulled rearwardly, and this will cause the rod 88 to slide rearwardly in the member 74 under the compression of spring 90, which will pull the member 74 rearwardly and also pull 75 rearwardly, which will lower the front ends of the cultivator beams, and the lower ends of members 69 and 70 will be forced downwardly and forwardly and cause the rear ends of the cultivator beams to be forced into the ground, and, with the parts adjusted in this position, if the cultivator mechanism should strike an elevated portion of ground and the front wheels not strike this elevated portion, and thus cause undue strain to be placed on the cultivators, then undue strain will be placed upwardly on the members 66 and 67, and undue strain will be exerted forwardly on the member 75, and this will cause the member 74 to move forwardly, compressing the spring 90 in the hollow member 74, and will allow the cultivator mechanism to follow the contour of the ground, without the necessity of changing the adjustment of lever 79.

In the drawings and specification I have set forth a preferred embodiment of my invention, and although specific terms are employed, they are used in a generic and descriptive sense only, and not for purposes of limitation, the scope of the invention being set forth in the appended claims:

I claim:

1. In a tractor cultivator having cultivator frames pivotally mounted at each side thereof, and adapted to have both lateral and vertical movement, a substantially vertically disposed member pivoted intermediate its ends above the rear portion of the cultivator frames, members secured to the rear portion of the cultivator frame, and having their upper ends pivotally secured to the said pivoted member, a forwardly projecting member, pivotally secured to the upper end of said pivoted member, and having its other end secured to the front end of the cultivator frame, a rearwardly projecting member pivotally secured to the upper end of said pivoted member, a lever having pawl and ratchet mechanism and being pivotally secured to the rear portion of the tractor, a resilient connection between said lever and said rearwardly projecting member, said resilient connection becoming non-resilient when the lever is pushed forwardly, whereby the cultivator frames may be raised.

2. In a tractor cultivator having a main frame, a forecarriage, doublebell crank levers mounted in said forecarriage and cultivator frames pivotally mounted on said doublebell crank levers, a longitudinally disposed beam secured to said forecarriage and to the rear portion of the tractor, a vertically disposed member pivoted intermediate its ends on said beam, members secured to the rear end of the cultivator and having their upper ends secured to the lower end of said pivoted member, a connection between the upper end of said pivoted member and the said bell crank lever, an adjustable lever mounted on the rear portion of the said beam, a member projecting rearwardly from the upper end of said pivoted member toward said lever, a connection between said lever and said rearwardly projecting member, adapted to becoming resilient when lever is pulled rearwardly and to becoming rigid when the lever is pushed forwardly.

3. In a power propelled cultivator, the combination of a main frame, cultivator frames mounted thereon for lateral and vertical movement, means for raising and lowering the cultivator frames, said means comprising a longitudinally disposed beam secured to the front and rear side portions of the main frame, a substantially vertically disposed member pivoted intermediate its ends to an intermediate portion of the longitudinally disposed beam, members pivotally connected to the lower end of the substantially vertically disposed member and having their other ends connected to the cultivator frames, a rod connected to the upper end of said substantially vertically disposed member and having its other end connected to the front portion of the cultivator frames, a member connected to the said upper ends of the substantially vertically disposed member and projecting rearwardly and having its rear end resiliently connected to an adjusting lever.

4. In a power propelled cultivator having a main frame, cultivator frames pivotally mounted on both sides of the main frame, means for raising and lowering the cultivator frames, said means comprising a member pivoted intermediate its ends at one side of the main frame, pivotal connections between one end of the pivoted member and the rear portion of the cultivator frame, a pivotal connection between the other end of the pivoted member and the front portion of the cultivator frame, an adjustable lever on the rear end of the main frame, and a resilient connection between said lever and the said pivoted member.

5. In a power propelled cultivator having a main frame, cultivator frames pivotally mounted on both sides of the main frame, means for raising and lowering the cultivator frames, said means comprising a member pivoted intermediate its ends at one side of the main frame, means for limiting the swing of the pivoted members rearwardly, pivotal connections between one end of the pivoted member and the rear portion of the cultivator frame, a pivotal connection between the other end of the pivoted member and the front portion of the cultivator frame, an adjustable lever on the rear end of the main frame, and a resilient connection between said lever and the said pivoted member.

6. In a tractor cultivator having a main frame, a cultivator frame pivotally mounted at its front end to the main frame and having a double bell crank lever to which the front end of the cultivator frame is pivotally mounted, a longitudinally adjustable member secured at its front end to the double bell crank lever, connections between said member, the double bell crank lever and the rear portion of the cultivator frame for positively raising and lowering the cultivator frame, and resilient means associated with said connections adapted to allow the cultivator frame to spring upwardly when unusual pressure is exerted thereon.

In testimony whereof I affix my signature.

EUGENE M. COLE.